US010211875B1

(12) United States Patent
Glass, Jr.

(10) Patent No.: US 10,211,875 B1
(45) Date of Patent: Feb. 19, 2019

(54) MOBILE PHONE AND MOBILE DEVICE CARRYING CASE

(71) Applicant: Aaron Lee Glass, Jr., Rialto, CA (US)

(72) Inventor: Aaron Lee Glass, Jr., Rialto, CA (US)

( * ) Notice: Subject to any disclaimer, the term of this patent is extended or adjusted under 35 U.S.C. 154(b) by 0 days.

(21) Appl. No.: 15/860,631

(22) Filed: Jan. 2, 2018

(51) Int. Cl.
| | | |
|---|---|---|
| *H04B 1/3888* | (2015.01) | |
| *A45C 11/00* | (2006.01) | |
| *H03M 1/02* | (2006.01) | |
| *A45F 5/00* | (2006.01) | |
| *H04M 1/02* | (2006.01) | |

(52) U.S. Cl.
CPC ............ *H04B 1/3888* (2013.01); *A45C 11/00* (2013.01); *A45F 5/00* (2013.01); *H04M 1/0202* (2013.01); *A45C 2011/002* (2013.01); *A45F 2200/0516* (2013.01)

(58) Field of Classification Search
None
See application file for complete search history.

(56) References Cited

U.S. PATENT DOCUMENTS

| | | | | |
|---|---|---|---|---|
| 2009/0127309 | A1* | 5/2009 | Wilcox ................ | A45C 13/30 224/579 |
| 2014/0084034 | A1* | 3/2014 | Wangercyn, Jr. ...... | H04B 1/385 224/217 |
| 2014/0221055 | A1* | 8/2014 | Wu ....................... | H04M 1/04 455/575.6 |

FOREIGN PATENT DOCUMENTS

CN          203023766 U  *  6/2013

* cited by examiner

*Primary Examiner* — Mohammed Rachedine

(57) ABSTRACT

A mobile phone and/or mobile device carrying case comprising openings on one side or corner placed adjacently on case allowing fasteners into the openings. To effect transport and fashion, mounts are fastened into or onto the fasteners. The mounts, positioned adjacently, allow the straps to connect to each mount enabling the mobile phone and/or mobile device carrying case to be held hands free around the shoulder, neck, and chest area.

4 Claims, 14 Drawing Sheets

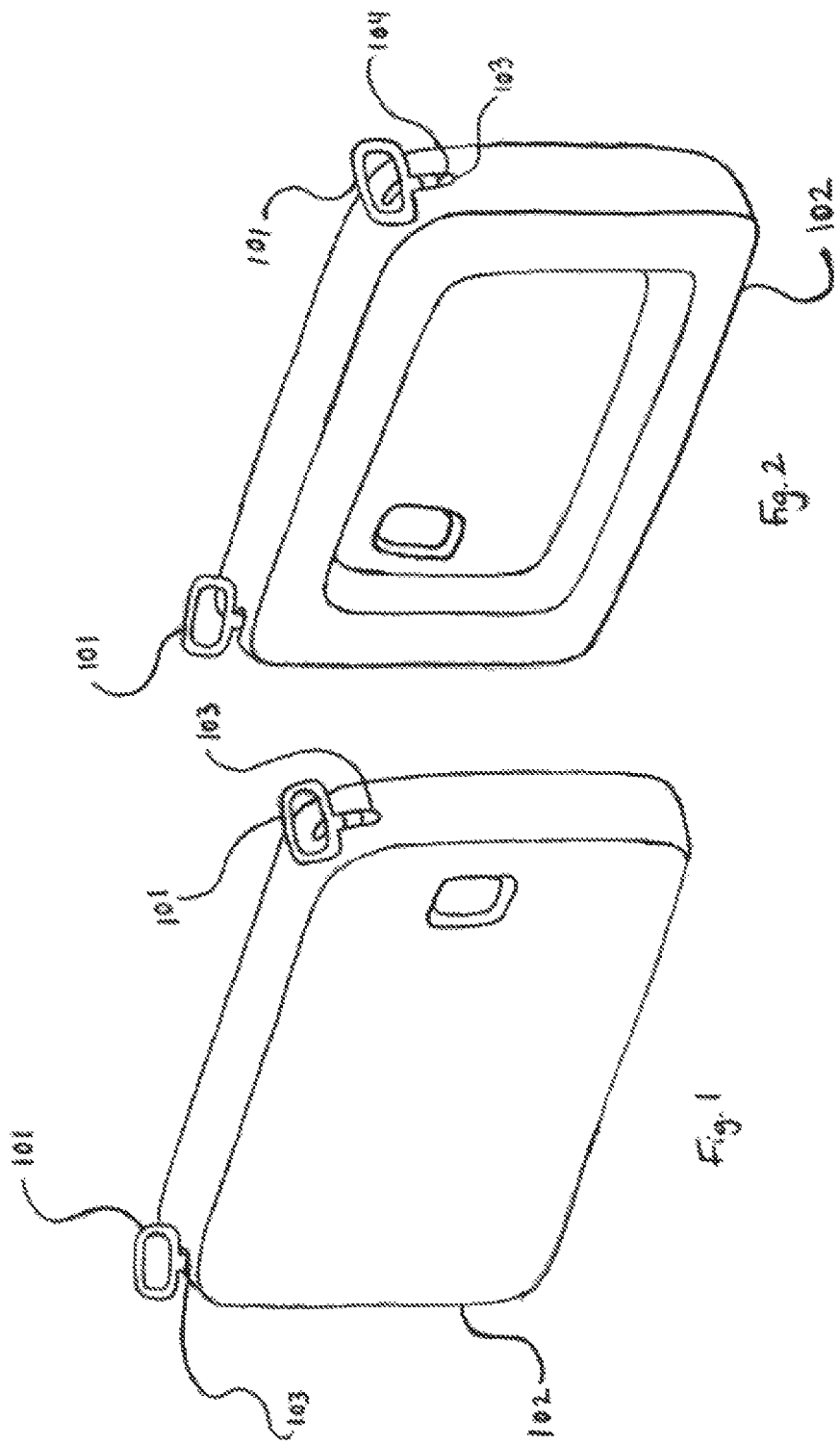

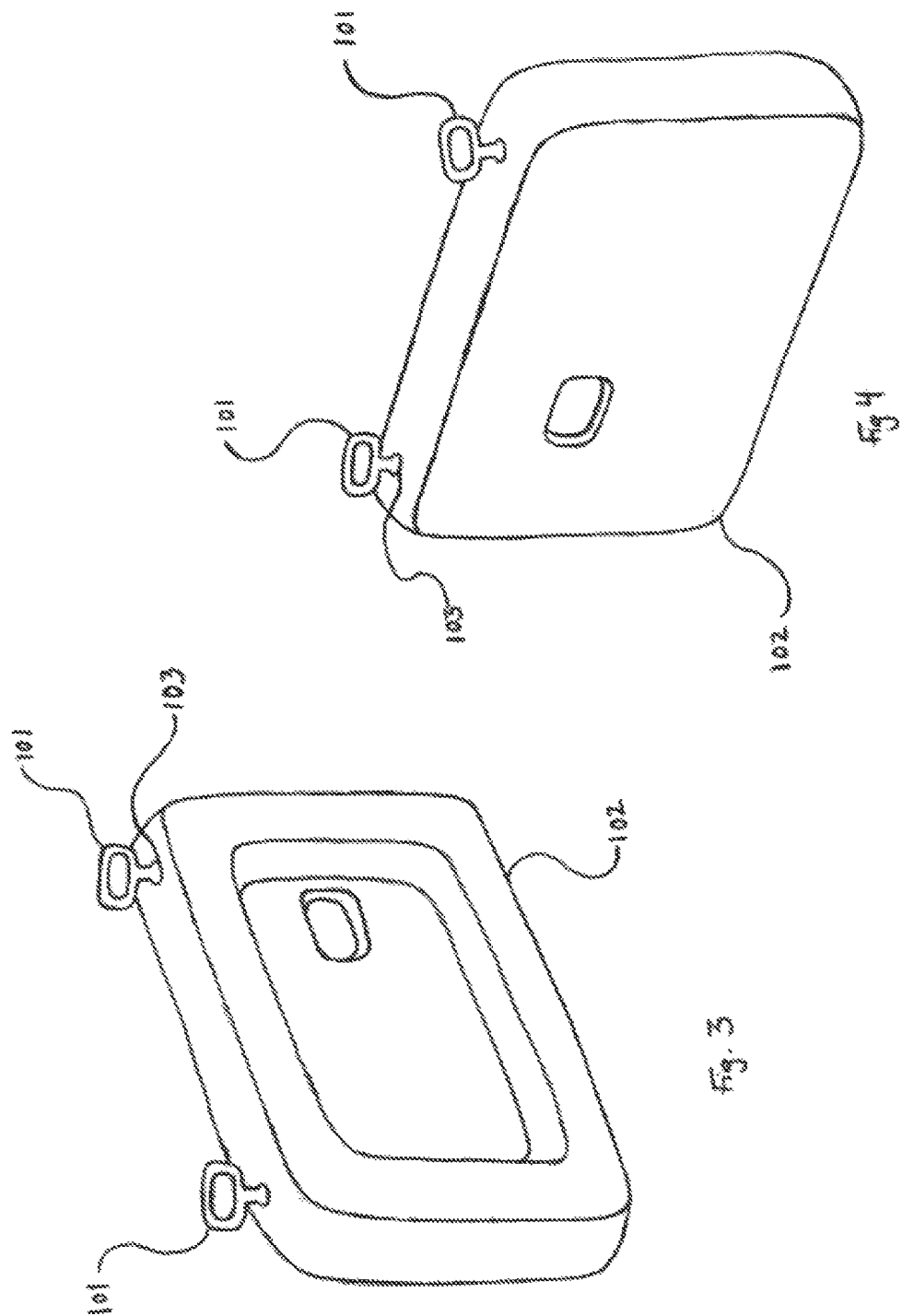

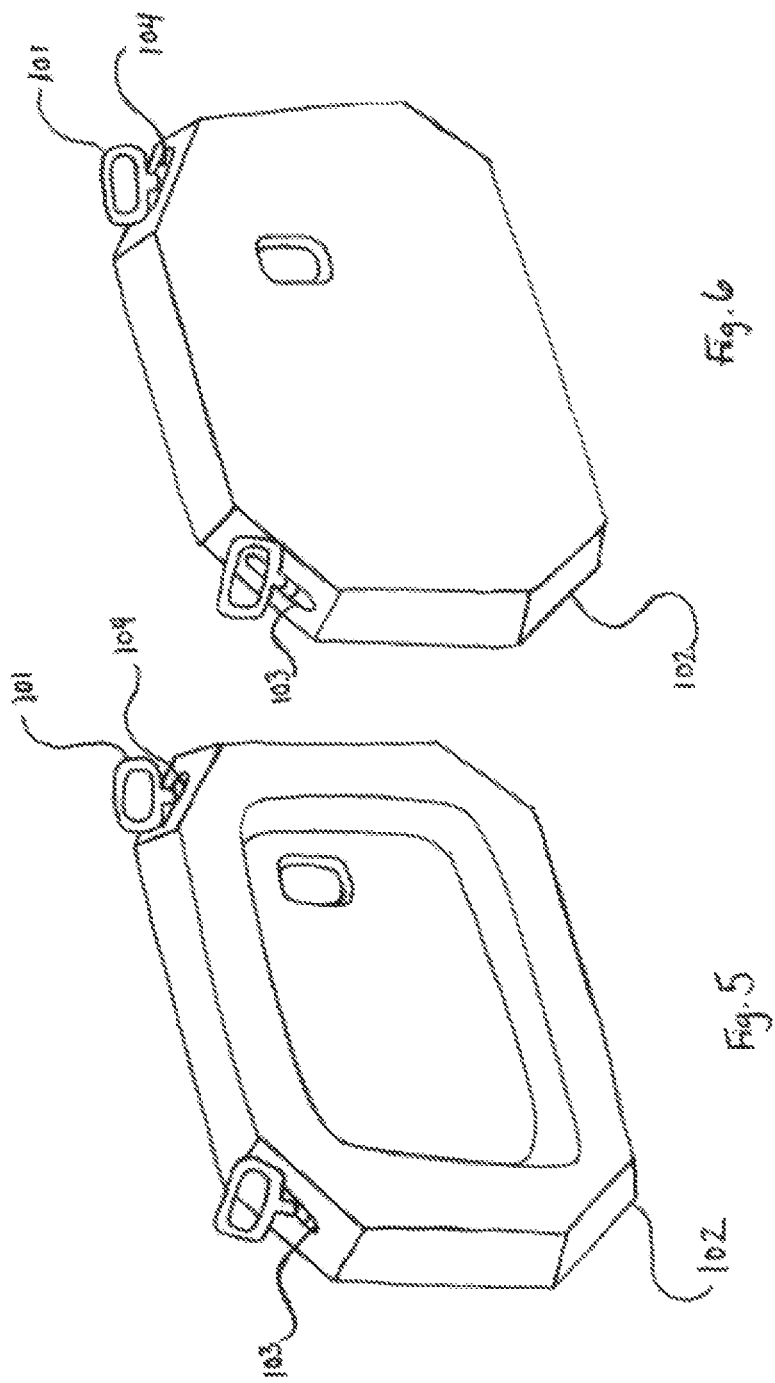

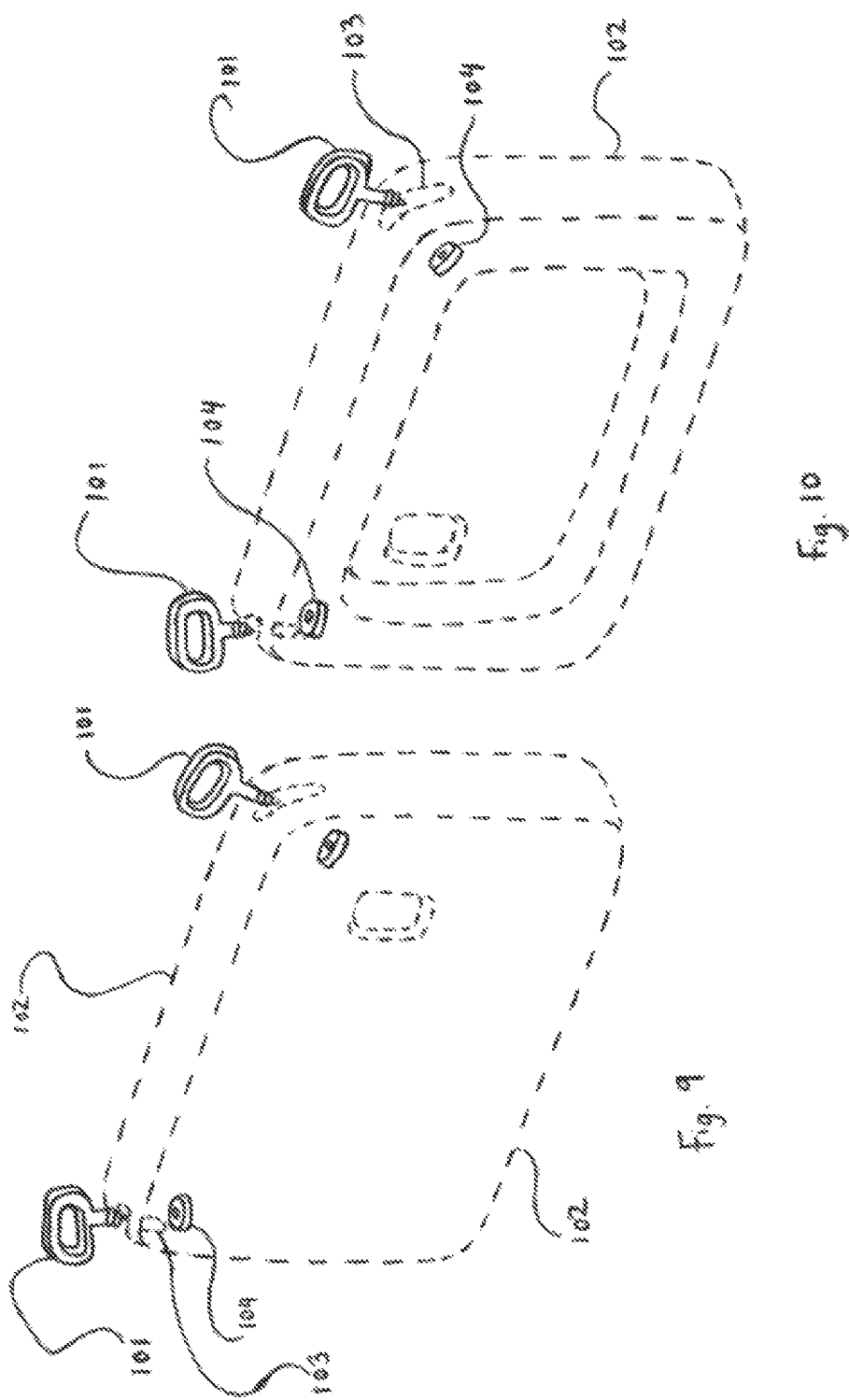

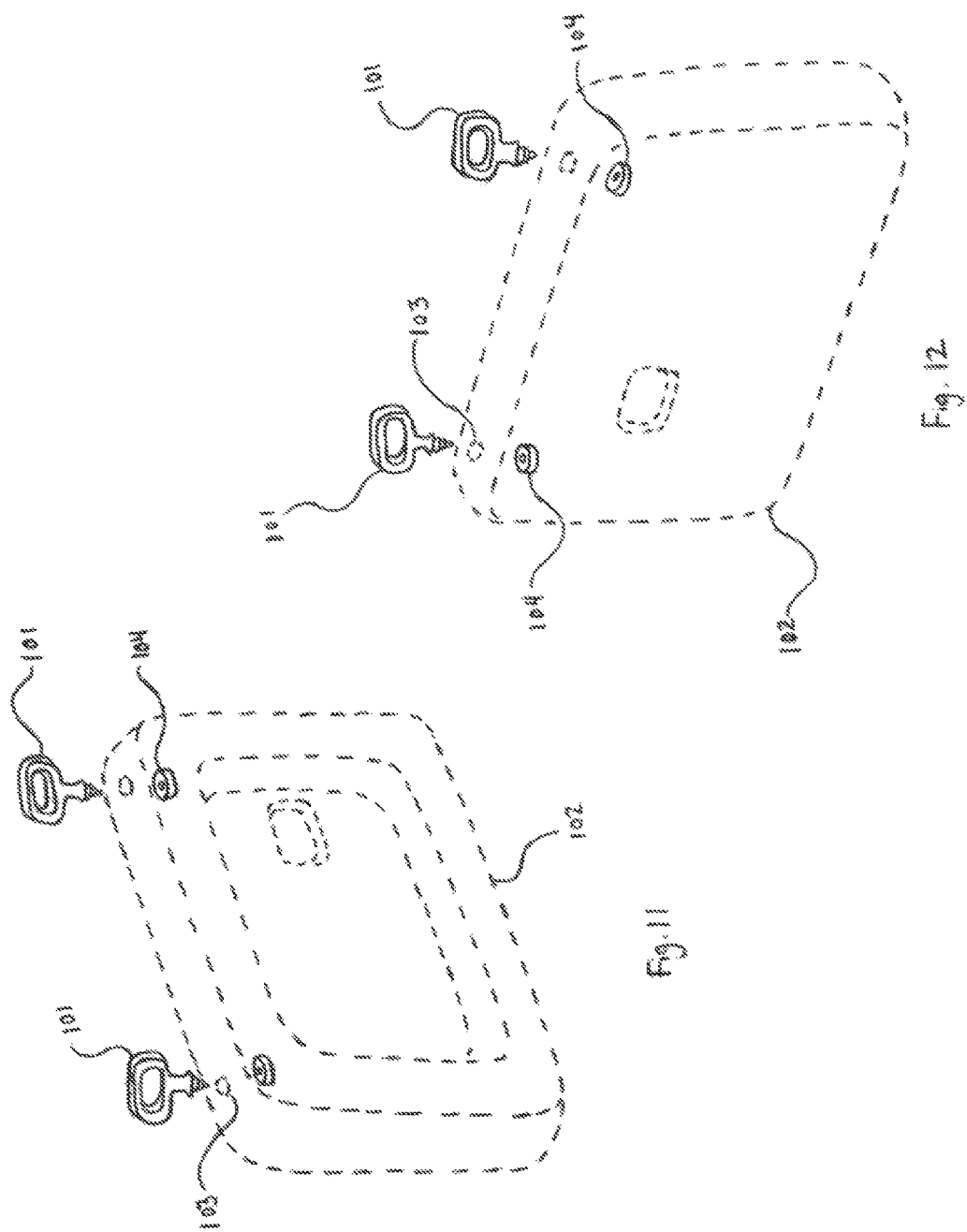

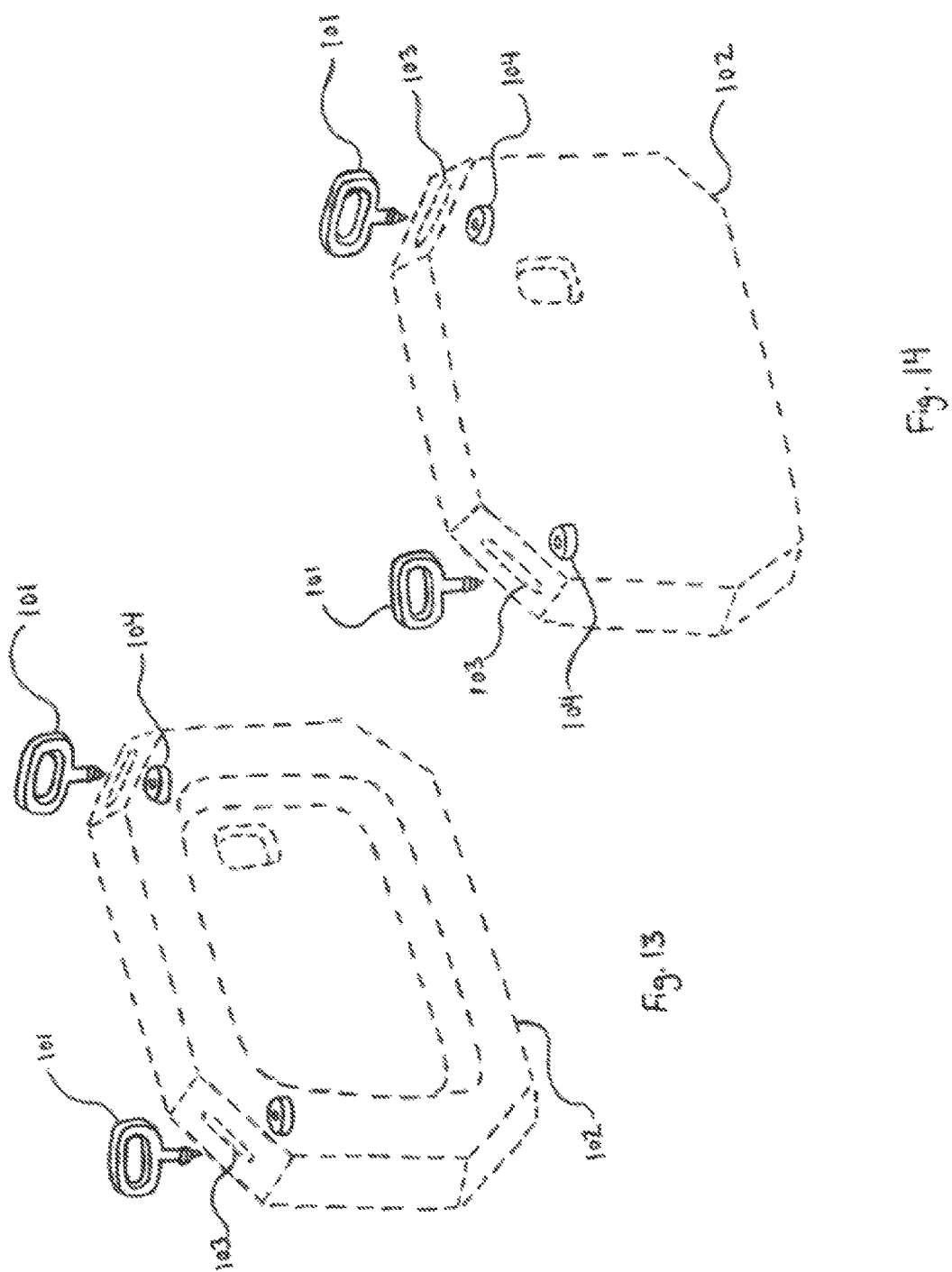

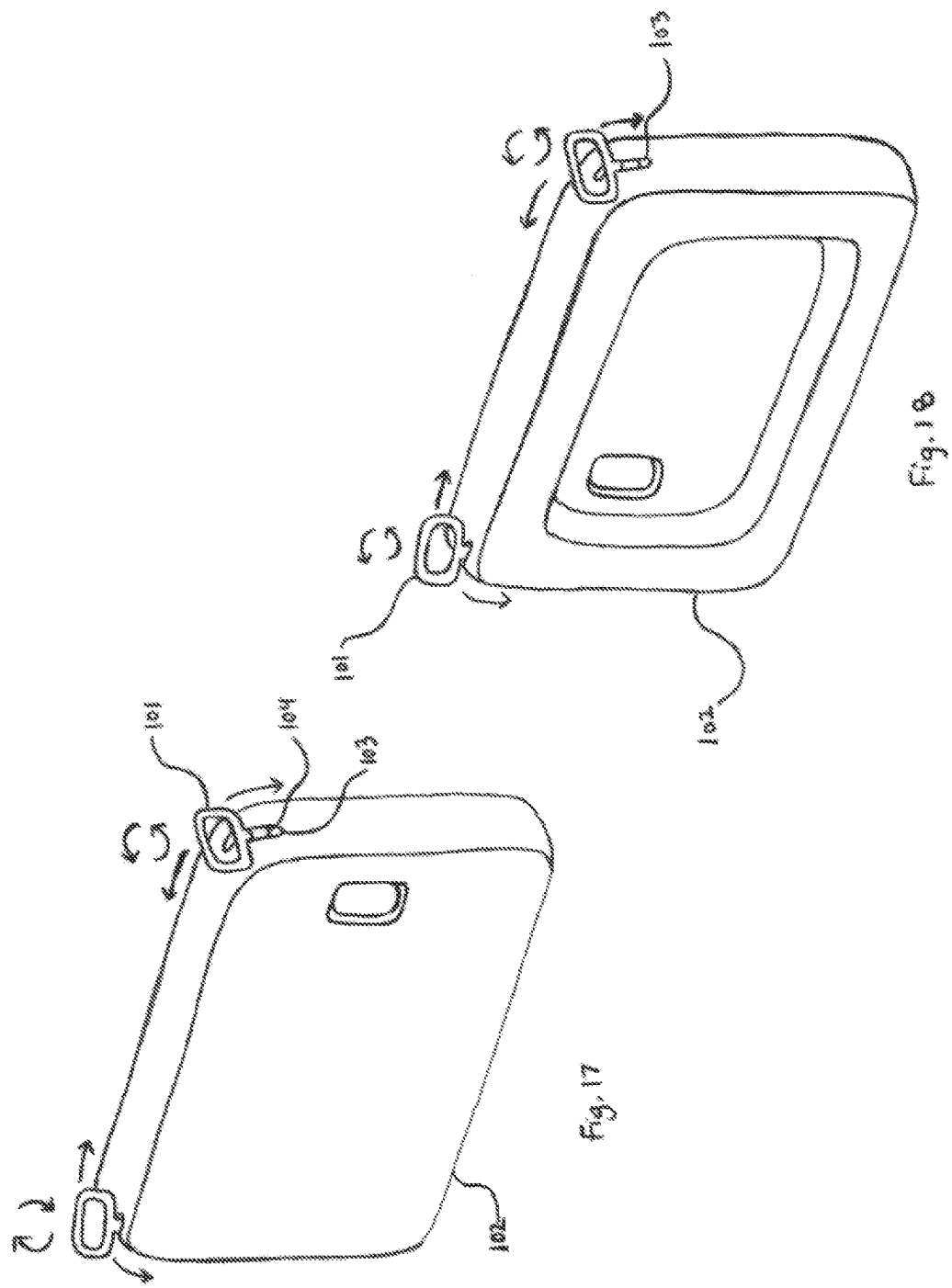

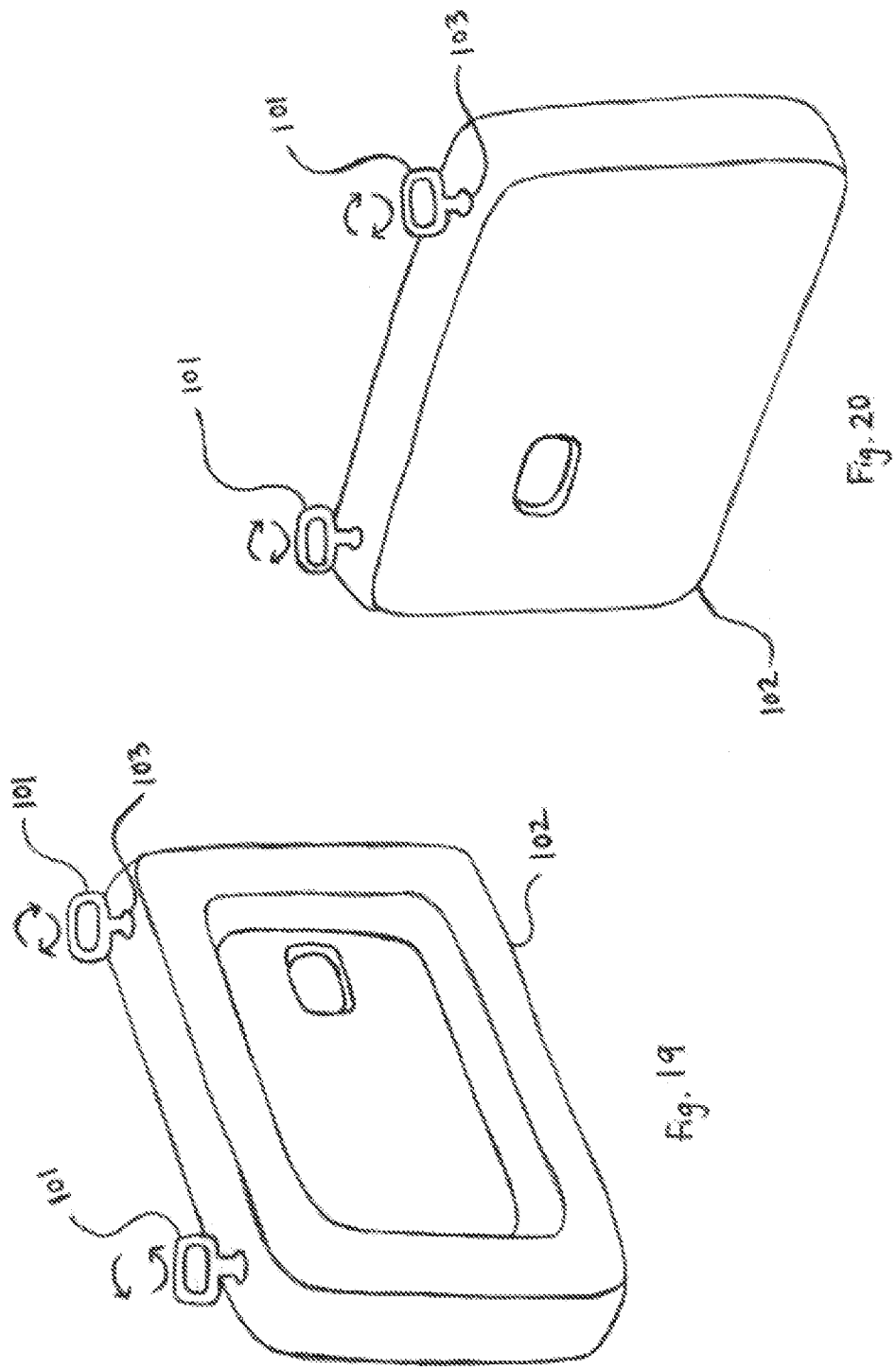

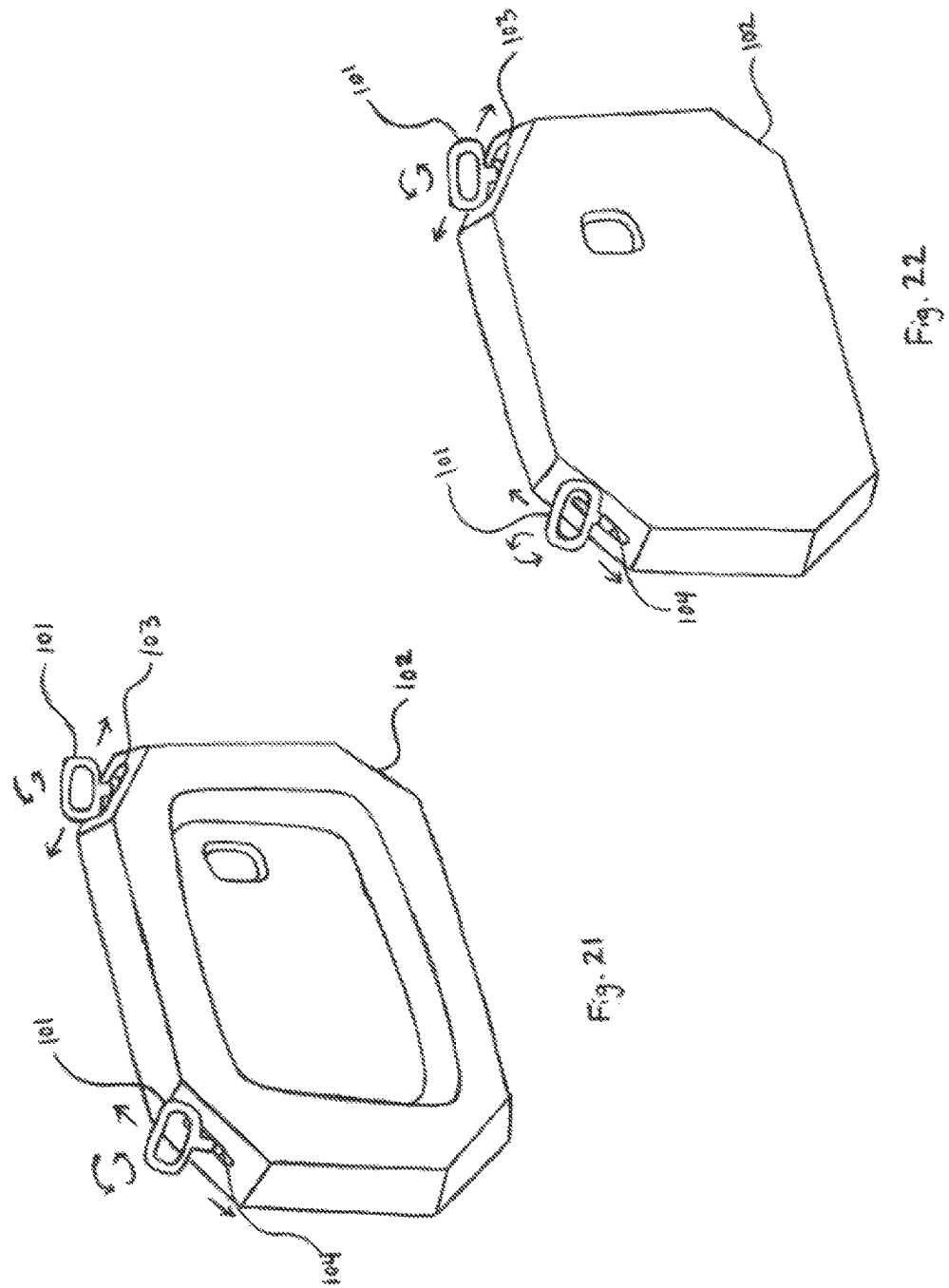

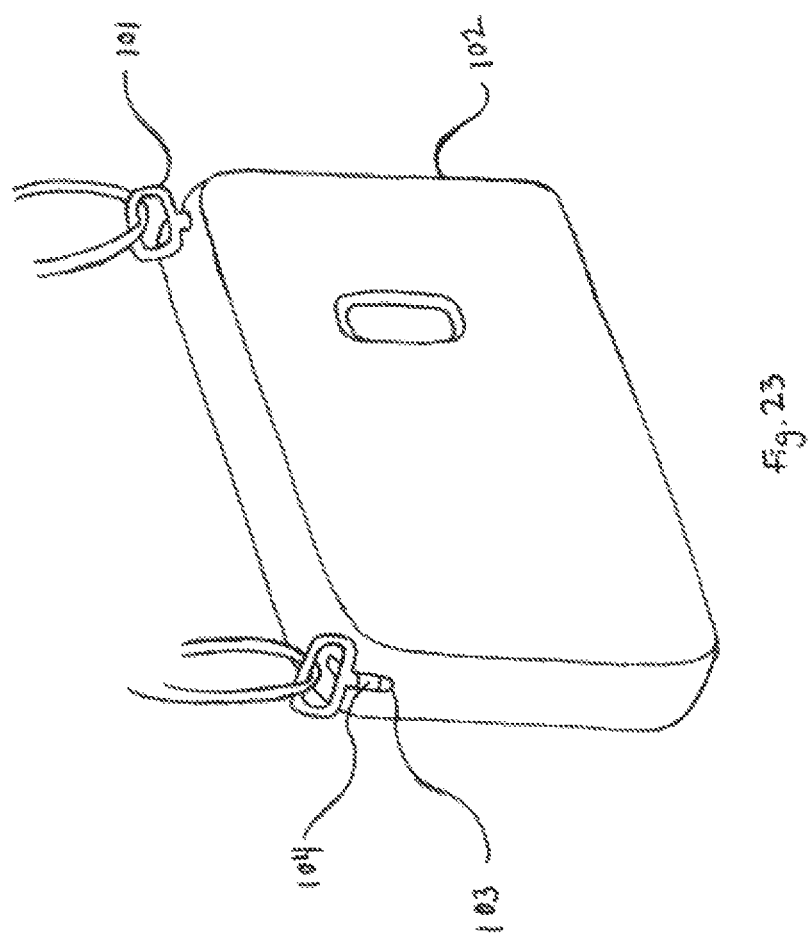

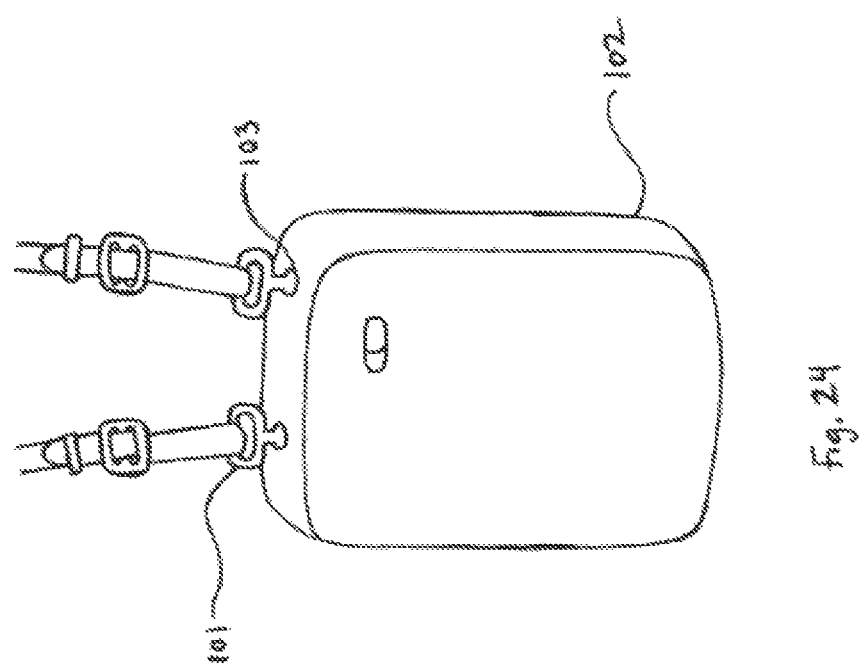

MOBILE PHONE AND MOBILE DEVICE CARRYING CASE

FIELD OF THE INVENTION

The present invention relates to mobile phone cases, storage, and carrying apparatus which uses a unique case with openings and fasteners on adjacent sides of the unit which clips straps, rope and/or necklace to secure to both sides of the apparatus to allow the device storage unit to be worn around the neck in a necklace fashion or over the shoulder in a carrying manner as primary uses. Wearing the mobile phone and/or mobile device around the neck safely secures the device in the chest area enabling quick access to the mobile phone and/or mobile device and case for taking pictures and filming using the mobile phone and/or mobile device and case.

BACKGROUND

Mobile phones and mobile devices have become an essential part of daily life globally. The way people use their mobile phones and mobile devices has changed tremendously over the years. One of the most popular uses of mobile phones and devices are taking pictures and filming video.

Mobile phone and mobile device accessories have played a large role in device preservation and protection. The mobile phone and mobile device accessories industry has grown but innovation has not grown with it.

There are mobile phone and device cases to protect the device from damage, the elements, and cosmetic appeal through design. The development of mobile phone and device cases have expanded to many innovations but are limited. Many of the innovations are cosmetic and protecting the device from damage and water.

When taking pictures and filming using a mobile phone or device, it is important to be quick to enable photography and filming before the activity ends. Most mobile phone and device cases are simply held in the case and place into the pockets, handbag, or holster. This does not allow for quick actionable movement.

Placing a mobile phone or device, which are in a mobile phone or device case for protection, without a holster is very limiting. The phone is usually placed in the pocket while traveling around such as walking and riding a bike. When a person is walking around an amusement park or concert, phones are usually held in one's hands or placed in pockets waiting for the right moment to capture using the mobile phone or device. If the mobile phone or device is not accessed quickly, the opportunity is missed.

Placing a mobile phone or device, which are in a mobile phone or device case for protection, without a holster into a handbag is also very limiting. When a person is walking around an event, phones are usually placed in the handbags waiting in the handbag until the mobile phone or device is used to take a picture or film. If the mobile phone or device is not accessed quickly, the opportunity is missed as the device was in the handbag.

Another type of popular mobile phone case is the holster. Common mobile phone and device holsters exist in two ways. One way is simply a mobile phone or device without a protective case placed into the mobile phone and device holster. The other common option is a mobile phone or device inside a protection case which is then placed into a fitted holster. These holsters are traditional designed to fit and clip onto the belt of one's waist.

Many other innovations in the mobile phone and mobile device case industry have been designed for cosmetic appeal. Mobile phone and mobile device cases have been designed to provide cosmetic appeal of all type to imbedded, faux diamond studs and many others.

Currently, there isn't a mobile phone or device case that is designed or can be worn around the neck or shoulder. By allowing mobile phone and/or device users to have an apparatus that can store the mobile phone and/or device in a protective case with capability to be worn around the neck or shoulder, users of mobile phone and/or devices can access their phones faster while allowing hands free storage in a fashionable manner.

BRIEF SUMMARY OF INVENTION

The present invention relates to mobile phone and mobile device carrying cases and accessories. The apparatus is configured to carry, store, and protect the mobile phone and/or mobile device carrying case while being worn around the neck or shoulder enabling quick access to take photos and record video while engaging in other activities such as walking around an amusement park, going to the beach and engaging in day to day activities where there is a need or desire to take a photo and/or film video.

The embodiment of this invention allows a strap or necklace type of material to secure to each fastener on adjacent sides of said invention enabling the apparatus to be worn around the neck area, in a necklace fashion or over the shoulder in pursue or handbag position, for quick access.

The embodiment of said invention has two fasteners. Each fastener mounts to one side of said invention positioned adjacently. Each fastener is positioned adjacently on one side. The fasteners are attached to this embodiment using small nuts. The fasteners have mounting loops enabling the necklace or straps to secure the apparatus allowing the apparatus to be worn around the neck or shoulder.

BRIEF DESCRIPTION OF THE DRAWINGS

The embodiment of the present invention is illustrated as an example and are not limited by illustrations submitted within.

FIG. 1 illustrates back and side view of preferred embodiment with elongated entry holes.

FIG. 2 illustrates front and side view of preferred embodiment with elongated entry holes.

FIG. 3 illustrates front and side view of embodiment of single hole opening variation.

FIG. 4 illustrates back and side view of embodiment of single hole opening variation.

FIG. 5 illustrates front and side profile angled surface variation with elongated fastener opening.

FIG. 6 illustrates back and side profile of angled surface variation with elongated fastener opening.

FIG. 9 illustrates a transparent view of the back and side displaying placement of fasteners with mounting loops and nuts.

FIG. 10 illustrates a transparent view of front and side displaying placement of fasteners with mounting loops and nuts.

FIG. 11 illustrates a transparent view of front and side displaying placement of fasteners with mounting loops and nuts.

FIG. 12 illustrates a transparent view of back and side displaying placement of fasteners with mounting loops and nuts.

FIG. 13 illustrates a transparent front and side view displaying placement of fasteners with mounting loops and nuts on hexagon shaped embodiment.

FIG. 14 illustrates a transparent back and side view displaying placement of fasteners with mounting loops and nuts on hexagon shaped embodiment.

FIG. 17 illustrates back and side view of embodiment using arrows to display movement of fasteners with mount loops up and down and circular motion.

FIG. 18 illustrates front and side view of embodiment using arrows to display movement of fasteners with mount loops up and down and circular motion.

FIG. 19 illustrates front and side view of embodiment using arrows to display movement of fasteners with mount loops in circular motion.

FIG. 20 illustrates back and side view of embodiment using arrows to display movement of fasteners with mount loops in circular motion.

FIG. 21 illustrates front and side view of hexagon shaped embodiment using arrows to display movement of fasteners with mount loops up and down and circular motion.

FIG. 22 illustrates back and side view of hexagon shaped embodiment using arrows to display movement of fasteners with mount loops up and down and circular motion.

FIG. 23 illustrates back and side view of string/necklace entering fastener mount loops displaying one usage variation.

FIG. 24 illustrates back and side view of straps positioned inside fastener mount loops displaying one usage variation.

DETAILED DESCRIPTION OF INVENTION

The terminology utilized is for the purpose of describing the embodiment of the said invention herein. The terminology is not intended to be limiting to this said invention. Volume, power, and other button opening in or on traditional mobile phones and mobile devices are not depicted in illustrations of said invention in the utility of the apparatus herein. Camera and flash openings for illustration purposes should not limit said invention to specific mobile phones and mobile devices.

Unless otherwise defined, all terms used herein have the same meaning as commonly understood. It is understood that terms used in describing and explanation of said invention can be found in dictionaries. All art should be utilized to understand the said invention herein gathering better understanding of device utility.

The description will refrain from repeating every possible combination of described invention herein. The specification and claims should be read with the understanding combinations are entirely within the scope of the said invention and claims herein.

Figure 7:
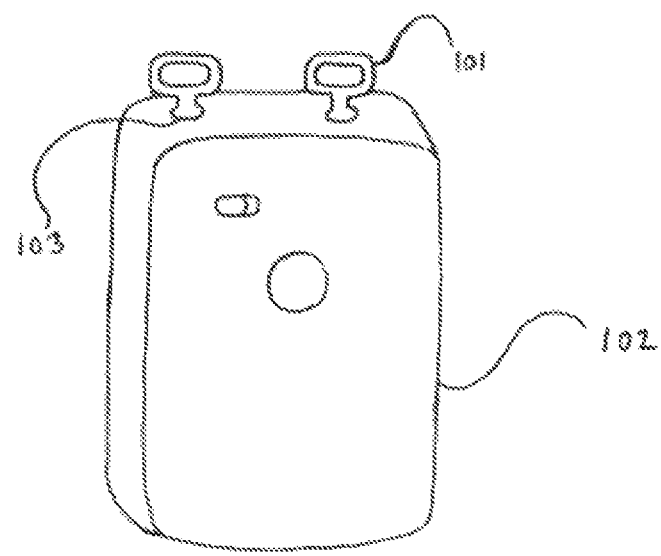
FIG. 7 illustrates back and side view displaying fasteners with mounting loops on shortest side of embodiment.
Figure 8:
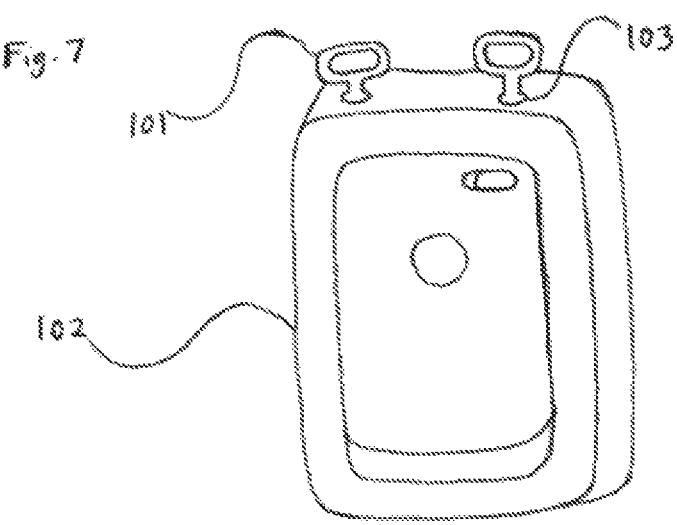
FIG. 8 illustrates front and side view displaying fasteners with mounting loops on the shortest side of embodiment.
Figure 16:
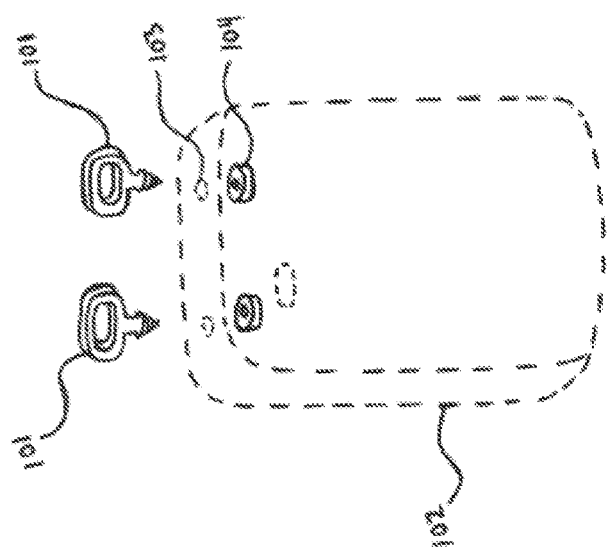
FIG. 16 illustrates a transparent back and side view displaying placement of fasteners with mounting loops and nuts on the shortest side of embodiment
Figure 15:
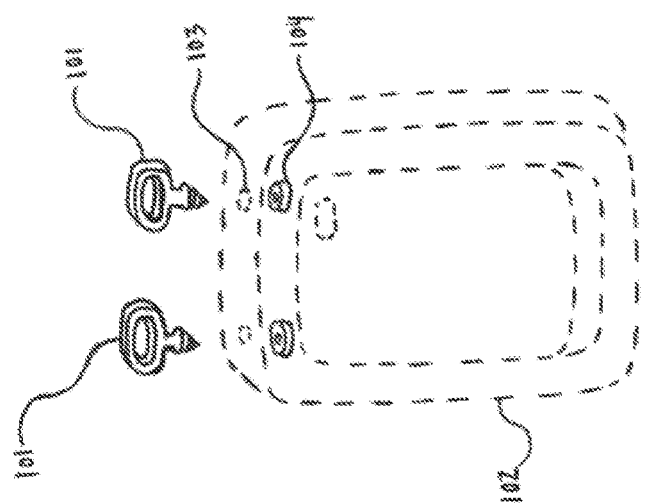
FIG. 15 illustrates a transparent front and side view displaying placement of fasteners with mounting loops and nuts on the shortest side of embodiment.
Figure 25:
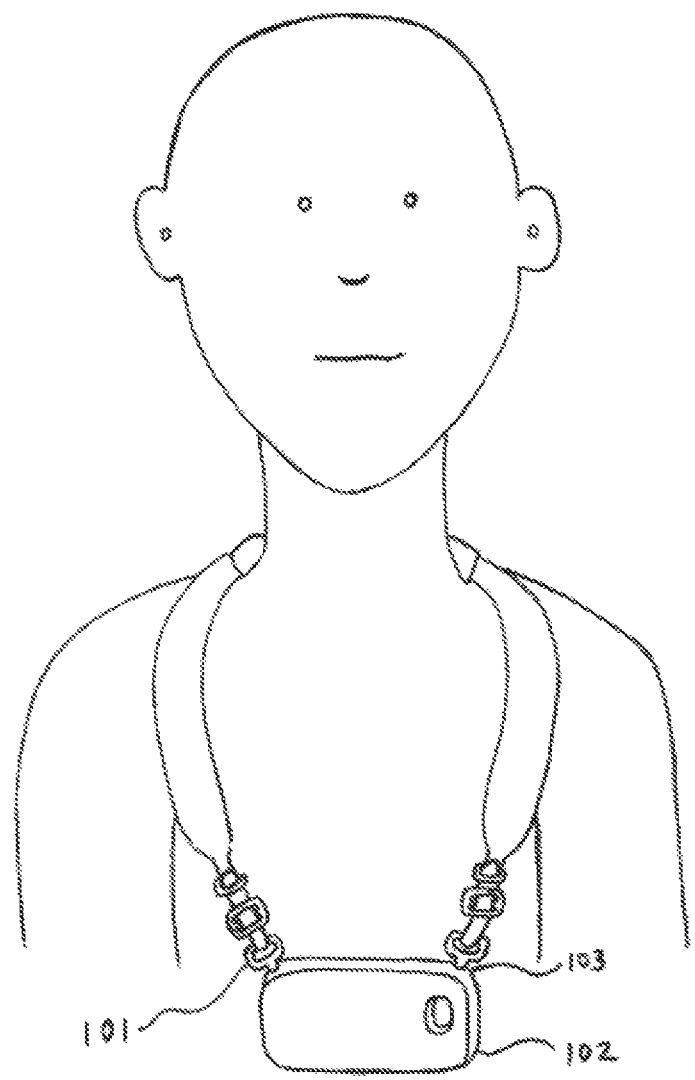
FIG. 25 illustrates one variation of wearing the embodiment using straps.

The present invention is a mobile phone and mobile device carrying case 102, FIGS. 1, 2, 3, 4, 5, 6, 7, 8, 9, 10, 11, 12, 13, 14, 15, 16, 17, 18, 19, 20, 21, 22, 23, 24 and 25 having two loop shaped mounts with each placed adjacently on one side of the mobile phone and mobile device case, 101, mounted to the exterior or interior of the mobile phone or mobile device case. The loop shaped mount fasteners, 101, is secured onto or into entry holes, 103, FIGS. 1, 2, 3, 4, 5, 6, 7, 8, 9, 10, 11, 12, 13, 14, 15, 16, 17, 18, 19, 20, 21, 22, 23, 24 and 25, using nuts, 104, FIGS. 2, 5, 6, 9, 10, 11, 12, 13, 14, 15, 16, 17, 21 and 22.

The mobile phone and mobile device carrying case 102, FIGS. 1, 2, 3, 4, 5, 6, 7, 8, 9, 10, 11, 12, 13, 14, 15, 16, 17, 18, 19, 20, 21, 22, 23, 24 and 25 can be comprised of but not limited to natural, synthetic, and semi-synthetic material. The loop shaped mount fasteners 101, FIGS. 1, 2, 3, 4, 5, 6, 7, 8, 9, 10, 11, 12, 13, 14, 15, 16, 17, 18, 19, 20, 21, 22, 23, 24 and 25 can also be comprised of but not limited to natural, synthetic, and semi-synthetic material. The nut 104, FIGS. 2, 5, 6, 9, 10, 11, 12, 13, 14, 15, 16, 17, 21, 22 and 23, can also be comprised of but not limited to natural, synthetic and semi-synthetic material.

The embodiment of the mobile phone and mobile device carrying case 102 can have multiple shaped entry holes 103, FIGS. 1, 2, 3, 4, 5, 6, 7, 8, 9, 10, 11, 12, 13, 14, 15, 16, 17, 18, 19, 20, 21, 22, 23, 24 and 25. The loop shaped mount fastener 101 can be positioned in a single-entry hole 103, allowing circular movement, FIGS. 3, 4, 7, 8, 11, 12, 15, 16, 19, 20, 24, and 25. The loop shaped mount fastener 101 can also be positioned into or onto elongated, oblong, and abstract entry holes 103, allowing circular, horizontal, vertical and downward motions, FIGS. 1, 2, 5, 6, 9, 10, 13, 14, 17, 18, 21, 22, and 23.

The mobile phone and mobile device carrying case is a mobile phone and mobile device carrying case with loop shaped mounts on adjacent sides, with the use of straps, can be worn around the neck and shoulder, amongst other areas of the human body, allowing hands free device travel that allows the user quick access for take pictures and capture film. Users can utilize the handsfree capability offered by this apparatus as an alternative to mobile phone holsters that clip to the belt and other protective cases that are held in an individuals' hands, pockets and bags.

What is claimed is:

1. A phone or tablet carrying case comprising:
    a carrying case configured to accept a phone or tablet;
    the carrying case having a pair of loop fasteners;
    each of the loop fastener is mounted on opposing corners of the carrying case;
    a pair of entry holes in the carrying case to allow free rotational movement of the looped fasteners through the entry holes of the carrying case, and
    a hole opening in the loop fasteners that are configured to allow straps to connect to each loop fastener to enable holding of the carrying case around a desired area of a user.

2. The phone or tablet carrying case according to claim 1, wherein each of the loop fasteners are ring shaped.

3. The phone or tablet carrying case according to claim 1, wherein each of the loop fasteners have a split to allow the loop fasteners to be installed and removed through the pair of entry holes.

4. The phone or tablet carrying case according to claim 1, wherein the pair of entry holes pass through the phone or tablet carrying case.

* * * * *